United States Patent Office 2,755,138
Patented July 17, 1956

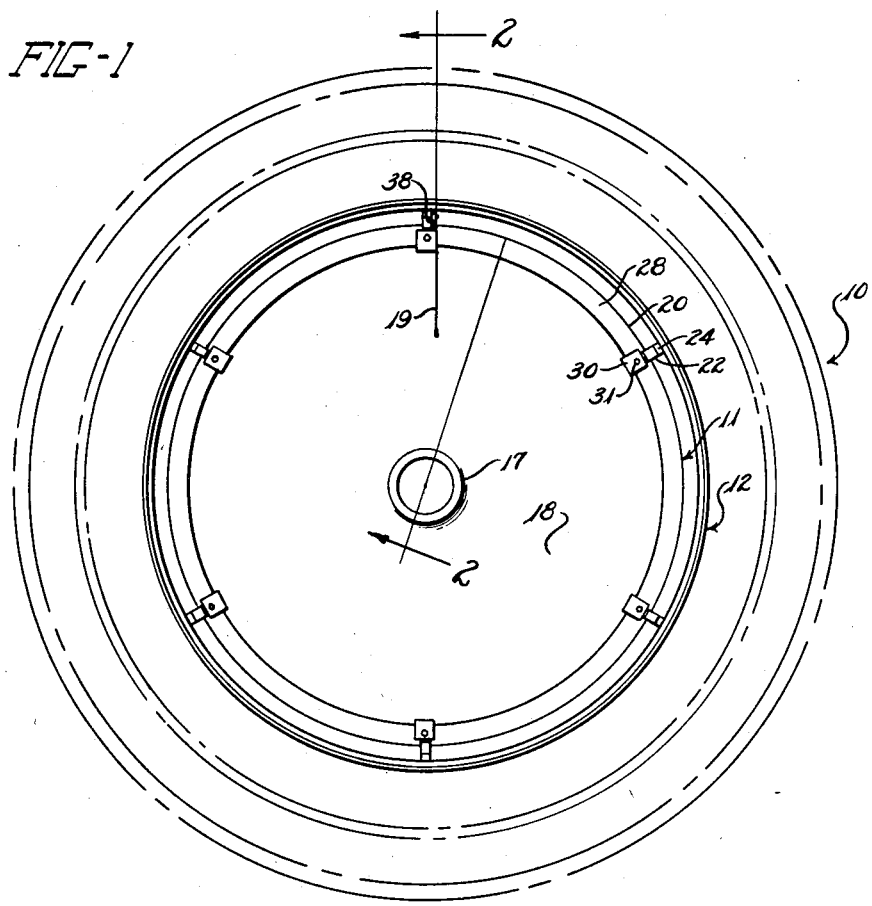

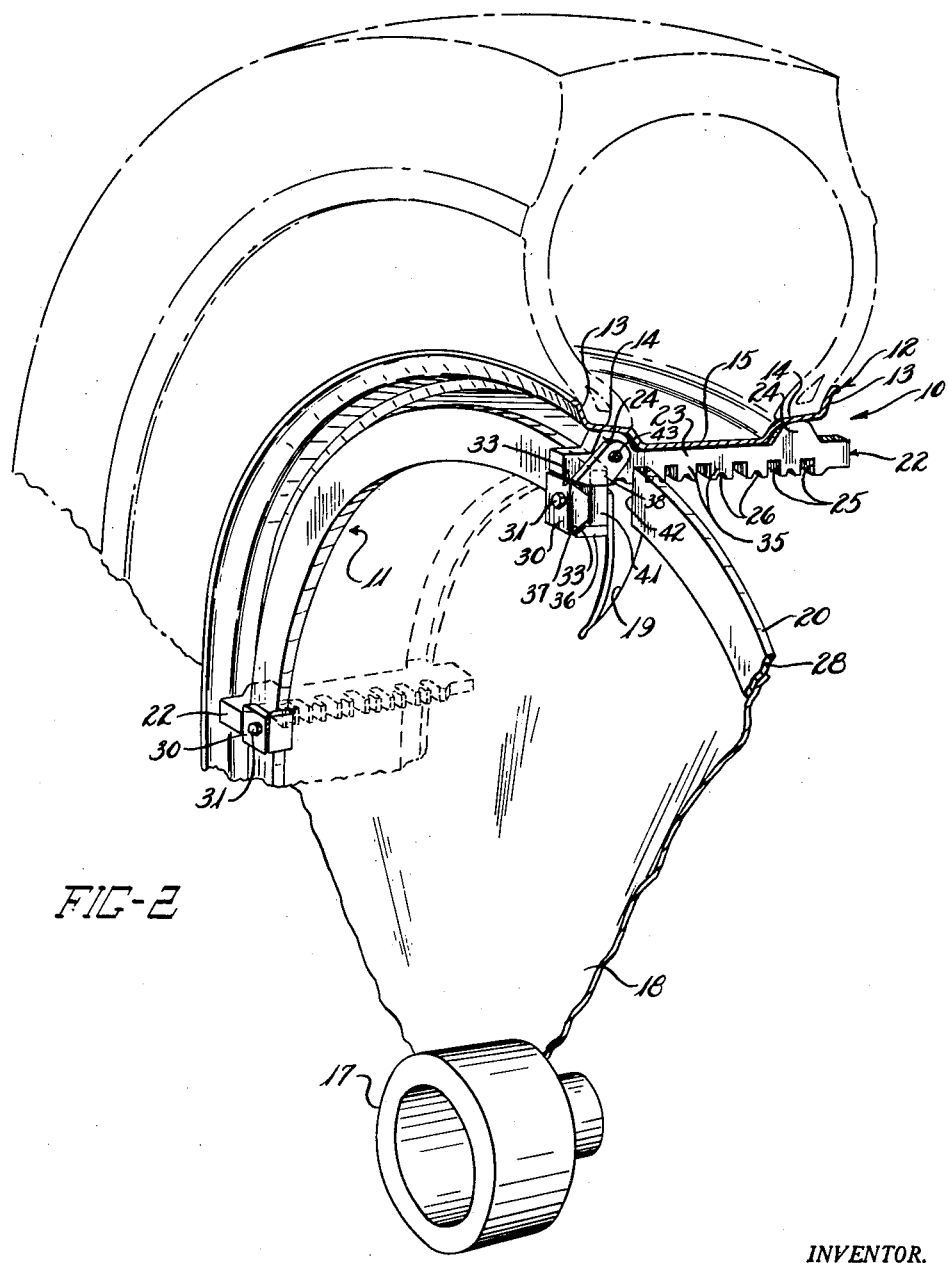

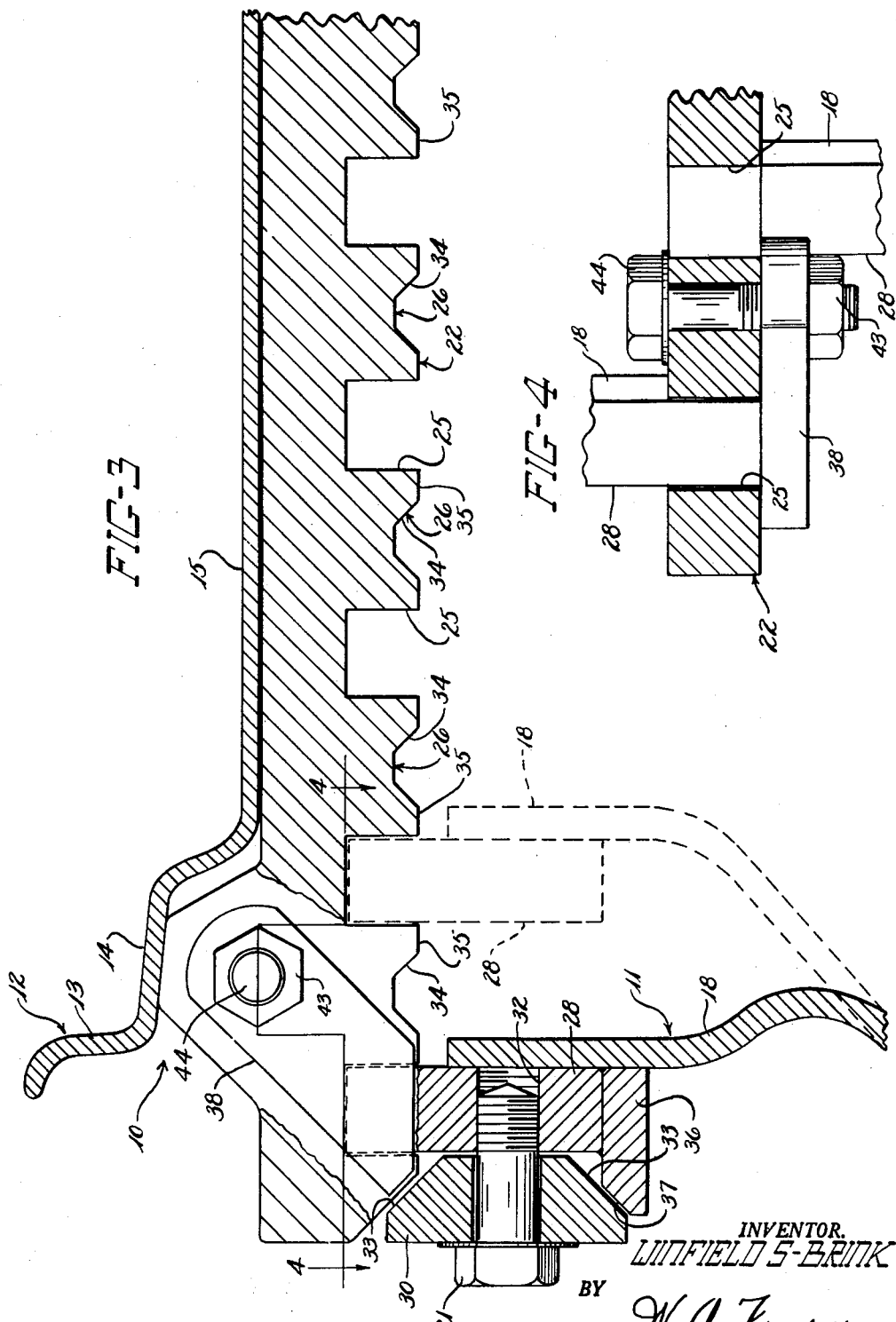

2,755,138

WHEEL CONSTRUCTION

Winfield S. Brink, Akron, Ohio, assignor to The Firestone Tire & Rubber Company, Akron, Ohio, a corporation of Ohio Application January 28, 1954, Serial No. 406,676

9 Claims. (Cl. 301—9)

This invention relates to tractor wheels and more particularly to a wheel construction enabling the spacing of tractor wheels to be varied.

It is desirable to be able to adjust the spacing of rear tractor wheels in order to adapt the tractor for use with agricultural crops of varied row spacing. While tractors having such adjustable wheels have been heretofore available, the wheel constructions prior to the present invention have been expensive and difficult to operate and maintain. The present invention overcomes these difficulties by providing a rim portion which is axially movable on and with respect to the supporting central disc portion of the wheel. The rim has a plurality of notched bars which are spaced about the inner circumference of the rim and which are adapted to engage a helical outer edge of the disc. Means are provided to clamp the rim and disc portions together to form an integrally functioning wheel and such means are readily released to permit the adjustment of the relative axial positions of the two parts. When the clamping means are released application of power to the tractor axle will drive the disc within the rim and thereby force the rim inwardly or outwardly, depending upon the direction of rotation of the axle. The construction is simple and strong and it is virtually fool-proof in operation.

It is, accordingly, a general object of the invention to provide a novel wheel construction for agricultural tractors and the like, which enables an adjustment of the wheel spacing over a relatively wide range.

Another object is to provide a tractor wheel construction in which the wheel spacing may be adjusted by utilizing the power of the rear axle.

A more specific object is to provide a tractor wheel construction comprising two relatively movable rim and disc parts whereby rotation of the disc within the rim will cause an axial adjustment of the rim position.

Another object is to provide a tractor wheel having relative movable parts whose axial positions may be adjusted with respect to each other together with effective clamping means which may be conveniently and quickly operated.

Yet another object is to provide a tractor wheel with relatively movable rim and disc parts and with stop means associated therewith to limit the relative movements of such parts.

Other objects are to provide a wheel of the type described which is strong and simple in design, which is reliable in operation, and which is virtually free from jamming or clogging.

These and further objects and advantages of the invention will be more readily apparent from the following description of a preferred form of the invention, reference being had to the accompanying drawings in which:

Figure 1 is a side elevation of a tractor wheel embodying a preferred form of the invention;

Figure 2 is a fragmentary perspective view, partly in radial section and broken away to show the construction of the wheel of Figure 1.

Figure 3 is a fragmentary section on an enlarged scale showing one of the notched guide bars secured to the rim and showing the means to clamp the rim to the disc portion of the wheel; and Figure 4 is a fragmentary sectional view of the stop means, the view being taken in the plane indicated by the lines 4—4 in Figure 3.

A tractor wheel 10 embodying the invention generally comprises two relatively movable parts, a disc portion, indicated generally at 11, and a rim portion indicated generally at 12. Normally clamps hold the two parts together to act as an integrally functioning wheel but the clamps may be released so that the relative axial position of the rim can be adjusted with respect to the disc so as to provide the desired wheel spacing. The arrangement is such that rotation of the disc portion by applying power to the rear axle of a tractor in one direction will cause the rim portion to move outwardly on the disc toward a position of greater wheel spacing, while reversing the power will pull the rim inwardly toward a position of closer wheel spacing.

The rim 12 which is of conventional drop center construction comprises the side flanges 13, tire bead seats 14 and a drop center well 15. The disc portion, except for the modification required by the present invention, is also of conventional design comprising a hub 17 by which the disc is removably secured to the driving axle of the tractor and a body disc portion 18 which is secured to the hub and which provides support for the rim of the wheel. The body 18 is formed from sheet steel of suitable thickness so as to have the required strength and rigidity.

In conventional wheel constructions the outer edge of the disc portion generally lies in a single plane so that the edge describes a true circle. In the present invention the disc body is partially split as indicated in 19 and its peripheral edge 20 is offset uniformly around the circumference of the body so as to describe a single turn of a helix.

The rim 12 has a plurality of axially extending bars 22 fixedly secured to the rim and notched in a manner to receive and engage the edge 20 of the disc portion. In the present example six such bars are spaced uniformly around the rim, but any convenient number of notched bars may be used. Each of the bars 22 has an intermediate portion 23 which extends adjacent to the inner surface of the drop center well 15 of the rim and has a pair of bosses 24 extending outwardly on each side of the well to contact and support the bead seats 14. The bars thus contact and support the rim in a manner to provide a rigid and strong mounting for the rim.

As will be observed particularly from Figure 1, the radially innermost edges of the bars are provided with a plurality of rectangular notches 25. These notches are spaced apart by a distance equal to the pitch of the helix which is described by the disc edge 20. Intermediate each adjacent pair of notches 25 is a smaller tapered notch 26, the purpose of which will be described later. It should be noted that the notched bars 22 are not identical but differ from one another in one respect. In order that each of the bars will contact the helical disc edge 20 it is necessary that the rectangular notches 25 of adjacent bars be displaced uniformly by an amount equal to $\frac{1}{6}$ of the pitch of the edge 20. Furthermore, the displacement by this amount must be in the same direction for all bars and must be progressive from bar to bar around the periphery of the rim. This feature places the corresponding notches 25 of the bars in a helical path with the result that there will be an effective engagement between the disc edge 20 and the notches 25 about the periphery of the wheel for all axial positions of the disc and the rim. Preferably there should be a snug fit between the edge 20 and the notched bars 22 so as to minimize any play between the two portions of the wheel and it is also desirable that the edge 20 be relatively strong and rigid. These objects are obtained by welding a curved bar or rail 28 of relatively heavy section to the edge of the disc with the outer portion of the rail adapted to fit snugly within the notches 25, see particularly Figure 1.

In use the wheels 10 are mounted on a tractor with the helices of the disc edge and notched bars of the right wheel extending oppositely to those of the left wheel. When power is applied to the rear axle the disc portion 11 of each wheel will tend to turn within its rim 12 and by virtue of the engagement of the helical disc edge 20 with the notched bars 22 an axial thrust will be transmitted to the rim to move it inwardly or outwardly depending upon the direction of the application of the power to the axle. For example, in Figure 2 if the wheel is driven counter clock-wise, as viewed, the rim portion 12 will be drawn inwardly to the left. Since there are seven rectangular notches 25 provided in the bars 22, six complete rotations of a disc portion 11 relative to the rim 12 will move the wheel in an axial direction by a distance slightly smaller than the width of the rim. Proportionally fewer numbers of rotations will result in a correspondingly smaller axial adjustment of the rim on the disc. The one relative rotation will move the rim approximately one-seventh of the rim width, a distance equal to the pitch of the helix.

The adjustment of the wheel spacing referred to above is accomplished only when the rim and disc portions of the wheel are free to move relative to each other. During regular working operation of the tractor it is necessary that the wheel spacing remain constant and, as mentioned above, this is accomplished by clamping means which hold the disc and rim together so that during operation the parts will function as an integral wheel.

The clamping means takes the form of individual members 30 which cooperate with the disc edge 20 to grip the notched bars 22 between them. The members 30 are of any convenient shape and are loosely secured to the edge bar 28 of the disc by means of bolts 31 which engage threaded holes 32 in the bar. The clamps are spaced equally about the disc so that each notched bar will have an adjacent cooperating clamp member.

The clamp members 30 are adapted to extend radially outwardly so that their edges fit within the tapered notches 26 with the tapered surfaces 33 of the clamps in position to engage corresponding surfaces 34 of the teeth 35 which are formed by the tapered notches 26 and adjacent rectangular notches 25. When the bolts 31 are tightened the clamp members will force the teeth against the adjacent portions of the edge bar 28 with sufficient force to hold the disc and rim together against relative rotation. When the bolts 31 are withdrawn slightly the clamping members 30 will ride freely within and through the tapered notches 26 permitting relative rotation of the rim and disc. It will be observed that during such relative rotation, the clamp members 30 will move in a helical path, by virtue of their attachment to the helical edge 20, and that this path passes through the tapered notches 26.

In order to balance the clamping forces on the bolts 31 and prevent bending forces from being imposed on the bolts, the edge bar 28 has a bracket 36 welded or otherwise secured to the rail beneath each hole 32 so that it extends out from the rail to partially underlie the adjacent clamp member 30. The brackets have tapered surfaces 37 oppositely inclined, but otherwise complementary, to the surfaces 34 of the notches 26. The bracket surfaces 37 are adapted to share the axial thrust of the clamp members with the notch surfaces 34 when the bolts 31 are tightened. Thus by means of the brackets the bolts are subjected to pure tension and the threads are kept from jamming.

The rim is prevented from moving bodily off the disc during the adjustment of the wheel spacing by means of stop members 38 which block the extreme inner and outer notches 25 respectively of one of the bars and which act as abutments for the free ends 41 and 42 of the edge bar 28, respectively. When the bar 28 makes abutting contact with either stop, further relative rotation of the disc within the rim is blocked. The stops thus set the extreme limits to the relative rotational and axial movements of the disc and rim parts. The stops are removably secured to the bar 28 by nuts 43 and bolts 44 so that they can be removed for assembly and disassembly of the wheel.

The invention has the advantages of simplicity and convenience. The construction is economical to manufacture and is strong and effective for the most demanding service. It enables a wide range of wheel spacing to be obtained, particularly since the construction enables the wheels to be reversed. The use of the spaced bars 22 of limited circumferential extent makes the construction virtually self-cleaning with little danger of clogging and jamming.

While a preferred form of the invention has been described various modifications will occur to those skilled in the art without departing from the spirit and scope of the invention, the essential features of which are summarized in the appended claims.

I claim:

1. In a wheel construction adapted to provide a variable wheel spacing for an agricultural tractor and the like, a disc portion and a rim portion mounted thereon, said disc portion comprising a hub adapted to removably mount said wheel on the axle of said tractor and a stamped metal body secured to said hub and terminating in an outer edge, said stamped body being split in a radial direction and said split edge being uniformly displaced axially around its periphery to define a helical path, and means secured to said rim and adapted to cooperate with said disc edge whereby relative rotation of said disc and rim portions results in axial movement of said rim on said disc, and additional means adapted to limit the relative rotation of said rim and disc portion and to retain said rim in mounted position on said disc.

2. In a wheel construction adapted to provide a variable wheel spacing for an agricultural tractor and the like, a disc portion and a rim portion mounted thereon, said disc portion comprising a hub adapted to removably mount said wheel on the axle of said tractor and a stamped metal body secured to said hub and terminating in an outer edge, said stamped body being split in a radial direction and said split edge being uniformly displaced axially around its periphery to define a helical path, and means secured to said rim and adapted to cooperate with said disc edge whereby relative rotation of said disc and rim portions result in axial movement of said rim on said disc, and means to releasably clamp said rim and disc portions against said relative rotation, and additional means adapted to limit the relative rotation of said rim and disc portion and to retain said rim in mounted position on said disc.

3. In a wheel construction adapted to provide a variable wheel spacing for an agricultural tractor and the like, a disc portion and a rim portion mounted thereon, said disc portion comprising a hub adapted to removably mount said wheel on the axle of said tractor and a stamped metal body secured to said hub and terminating in an outer edge, said stamped body being split in a radial direction and said split edge being uniformly displaced axially around its periphery to define a helical path, and means secured to said rim and adapted to cooperate with said disc edge whereby relative rotation of said disc and rim portions results in axial movement of said rim on said disc, said means comprising a plurality of notched bars secured to the inner surface of said rim at spaced points about the periphery thereof and extending axially with respect to said rim, the corresponding notches of said bars being displaced axially whereby to lie in a helical path having a pitch equal to the pitch of said edge, and additional means adapted to limit the relative rotation of said rim and disc portion and to retain said rim in mounted position on said disc.

4. In a wheel construction adapted to provide a variable wheel spacing for an agricultural tractor and the like, a disc portion and a rim portion mounted thereon, said disc portion comprising a hub adapted to removably mount said wheel on the axle of said tractor and a stamped metal body secured to said hub and terminating in an outer edge, said stamped body being split in a radial direction and said split edge being uniformly displaced axially around its periphery to define a helical path, and means secured to said rim and adapted to cooperate with said disc edge whereby relative rotation of said disc and rim portions results in axial movement of said rim on said disc, said means comprising a plurality of notched bars secured to the inner surface of said rim at spaced points about the periphery thereof and extending axially with respect to said rim, the corresponding notches of said bars being displaced axially whereby to lie in a helical path having a pitch equal to the pitch of said edge, and additional means adapted to limit the relative rotation of said rim and disc portion and to retain said rim in mounted position on said disc, comprising a pair of stop members removably secured respectively to two of said notched bars and providing abutments respectively for the ends of said split edge to hold said disc edge completely within the helical path of said notches.

5. In a wheel construction adapted to provide a variable wheel spacing for an agricultural tractor and the like, a disc portion and a rim portion mounted thereon, said disc portion comprising a hub adapted to removably mount said wheel on the axle of said tractor and a disc body secured to said hub and terminating in an outer edge, said body being split at said edge and said split edge being uniformly displaced axially around its periphery to define a helical path, and a plurality of notched bars extending across and secured to the inner surface of said rim portion at spaced points about the periphery thereof, the corresponding notches of said bars being displaced axially to lie in a helical path having a pitch equal to the pitch of said split edge with said notches receiving said split edge for sliding movement therein, whereby relative rotation of said disc and rim portions results in axial movement of said rim on said disc.

6. In a wheel construction adapted to provide a variable wheel spacing for an agricultural tractor and the like, a disc portion and a rim portion mounted thereon, said disc portion comprising a hub adapted to removably mount said wheel on the axle of said tractor and a body secured to said hub and terminating in an outer edge, said body being split at said edge and said split edge being uniformly displaced axially around its periphery to define a helical path, and a plurality of notched bars extending across and secured to the inner surface of said rim at spaced points about the periphery thereof, the alternate notches of said bars being displaced axially and comprising a first set of notches lying in a helical path having a pitch equal to the pitch of said split edge, said set of notches receiving said split edge for sliding movement therein whereby relative rotation of said disc and rim portions results in axial movement of said rim on said disc, and the remainder of the notches comprising a second set also arranged in a helical path, and clamps associated with said split edge and disposed to move in a path defined by the said second set of notches, said clamps being mounted on threaded bolts whereby when said bolts are tightened said clamps are drawn forcibly toward said edge to clamp the portions of said bars between said sets of notches between said clamps and said edge to hold said disc portion against movement with respect to said rim.

7. In a wheel construction adapted to provide a variable wheel spacing for an agricultural tractor and the like, a disc portion and a rim portion mounted thereon, said disc portion comprising a hub adapted to removably mount said wheel on the axle of said tractor and a body secured to said hub and terminating in an outer edge, said body being split at said edge and said split edge being uniformly displaced axially around its periphery to define a helical path, and a plurality of notched bars extending across and secured to the inner surface of said rim at spaced points about the periphery thereof, the alternate notches of said bars being displaced axially and comprising a first set of notches lying in a helical path having a pitch equal to the pitch of said split edge, said set of notches receiving said split edge for sliding movement therein whereby relative rotation of said disc and rim portions results in axial movement of said rim on said disc, and the remainder of the notches comprising a second set also arranged in a helical path, and clamps associated with said split edge and disposed to move in a path defined by the said second set of notches, said clamps being mounted on threaded bolts whereby when said bolts are tightened said clamps are drawn forcibly toward said split edge to clamp the portions of said bars between said sets of notches between said clamps and said edge to hold said disc against relative movement with respect to said rim, and additional means adapted to limit the relative rotation of said rim and disc portion and to retain said rim in mounted position on said disc, said additional means comprising a pair of stop members secured respectively to two of said notched bars and providing abutments respectively for the ends of said split edge to hold said disc edge completely within the helical path of said notches.

8. In a wheel construction adapted to provide a variable wheel spacing for an agricultural tractor and the like, a disc portion and a rim portion mounted thereon, said disc portion comprising a hub adapted to removably mount said wheel on the axle of said tractor and a stamped metal body secured to said hub and terminating in an outer edge, said stamped body being split in a radial direction and said split edge being uniformly displaced axially around its periphery to define a helical path, and means secured to said rim and adapted to cooperate with said disc edge whereby relative rotation of said disc and rim portions results in axial movement of said rim on said disc, and additional means adapted to secure said rim portion to said disc portion to retain said rim in mounted position on said disc.

9. In a wheel construction adapted to provide a variable wheel spacing for an agricultural tractor or the like, a disc-like body and a rim mounted thereon, said disc-like body having a hub portion adapted to removably mount said wheel on the axle of said tractor, said disc-like body being secured to said hub and having a peripheral edge formed with axially displaced portions, said peripheral edge being progressively displaced axially between said axially displaced portions to define a helical path, and means secured to said rim and adapted to cooperate with the helical edge whereby relative rotation of said disc and rim portions results in axial movement of said rim on said disc, and additional means adapted to secure said rim to said disc portion to retain said rim in mounted position on said disc.

References Cited in the file of this patent

UNITED STATES PATENTS

| | | |
|---|---|---|
| 2,417,139 | Strehlow | Mar. 11, 1947 |
| 2,432,385 | Court | Dec. 9, 1947 |

FOREIGN PATENTS

| | | |
|---|---|---|
| 811,786 | Germany | Aug. 23, 1951 |